United States Patent
Bahceci

(10) Patent No.: US 12,389,344 B2
(45) Date of Patent: Aug. 12, 2025

(54) BEAM PATTERN MANAGEMENT FOR CONTROLLING RADIATED POWER LEVELS AND SPATIAL PRIORITY

(71) Applicant: Telefonaktiebolaget LM Ericsson (publ), Stockholm (SE)

(72) Inventor: Israfil Bahceci, Kanata (CA)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 391 days.

(21) Appl. No.: 18/006,429

(22) PCT Filed: Aug. 13, 2020

(86) PCT No.: PCT/IB2020/057652
§ 371 (c)(1),
(2) Date: Jan. 23, 2023

(87) PCT Pub. No.: WO2022/034367
PCT Pub. Date: Feb. 17, 2022

(65) Prior Publication Data
US 2023/0269677 A1    Aug. 24, 2023

(51) Int. Cl.
H04W 52/42     (2009.01)
H04B 7/0426    (2017.01)
H04W 52/36     (2009.01)

(52) U.S. Cl.
CPC .......... *H04W 52/42* (2013.01); *H04B 7/0434* (2013.01); *H04W 52/367* (2013.01)

(58) Field of Classification Search
CPC .. H04W 52/42; H04W 52/367; H04B 7/0434; H04B 7/0482; H04B 7/0452
See application file for complete search history.

(56) References Cited

U.S. PATENT DOCUMENTS

2009/0088174 A1*  4/2009  Kikuchi ............. H04W 72/542
                                                              455/450
2016/0254855 A1*  9/2016  Tong ....................... H04L 69/22
                                                              370/316
(Continued)

FOREIGN PATENT DOCUMENTS

WO    2018/219438 A1    12/2018

OTHER PUBLICATIONS

International Search Report and Written Opinion dated May 3, 2021 issued in PCT Application No. PCT/IB2020/057652 filed Aug. 13, 2020, consisting of 13 pages.

(Continued)

*Primary Examiner* — Christine Ng
(74) *Attorney, Agent, or Firm* — Sonoda & Kobayashi Intellectual Property Law; Sarvajit S. Patil

(57) ABSTRACT

A method and network node for management of beams radiated by a phased array antenna of a network node to comply with regulatory or other constraints are provided. According to one aspect a network node is configured to selectively transmit radio frequency beams in a plurality of directions on a plurality of layers to a plurality of wireless devices. The network node includes processing circuitry configured to direct and beams to a first set of directions while suppressing energy radiated in a second set of directions according to algorithms that modify a precoder to achieve a distribution of radiated energy without computationally burdensome optimization algorithms.

22 Claims, 4 Drawing Sheets

(56) References Cited

U.S. PATENT DOCUMENTS

| | | | |
|---|---|---|---|
| 2017/0250743 A1* | 8/2017 | Jöngren | H04L 25/03343 |
| 2017/0264390 A1* | 9/2017 | Liu | H04L 1/0027 |
| 2017/0289932 A1* | 10/2017 | Islam | H04W 74/0833 |
| 2017/0303262 A1* | 10/2017 | Yuan | G01S 3/28 |
| 2017/0332407 A1* | 11/2017 | Islam | H04W 52/34 |
| 2017/0338865 A1* | 11/2017 | Chen | H04B 7/0408 |
| 2018/0062767 A1* | 3/2018 | Vallese | H04B 15/00 |
| 2018/0331740 A1 | 11/2018 | Orhan et al. | |
| 2019/0089428 A1 | 3/2019 | Bethanabhotla et al. | |
| 2019/0297579 A1* | 9/2019 | Bhattad | H04W 72/232 |
| 2021/0281308 A1* | 9/2021 | Wong | H04B 7/088 |
| 2021/0359731 A1* | 11/2021 | Sahraei | H04B 7/0465 |
| 2022/0167279 A1* | 5/2022 | Zhou | H04W 52/146 |
| 2023/0189343 A1* | 6/2023 | Rao | H04B 7/088 |
| | | | 370/329 |

OTHER PUBLICATIONS

Niklas Doose; Joint Precoding and Power Control for EIRP-Limited MIMO Systems; IEEE Transactions on Wireless Communications, vol. 17, No. 3, Mar. 2018, consisting of 11 pages.

Tae Min Kim et al., Transmit Beamforming for EIRP-Limited MIMO Systems Based on Golay Sequence; Globecom 2012—Wireless Communications Symposium, consisting of 6 pages.

Dr. Preston Marshall; Spectrum Access System: Managing Three Tiers of Users in the 3550-3700 GHz Band, Jan. 14, 2014, consisting of 6 pages.

ETSI TS 138 214 V15.6.0 (Jul. 2019) Technical Specification; 5G; NR; Physical Layer Procedures for Data (3GPP TS 38.214 version 15.6.0 Release 15), consisting of 108 pages.

47 CFR 101.113—Federal Communications Commission; Transmitter Power Limitations, 2008, consisting of 4 pages.

* cited by examiner

BEAM PATTERN MANAGEMENT FOR CONTROLLING RADIATED POWER LEVELS AND SPATIAL PRIORITY

CROSS-REFERENCE TO RELATED APPLICATIONS

This application is a Submission Under 35 U.S.C. § 371 for U.S. National Stage Patent Application of International Application Number: PCT/IB2020/057652, filed Aug. 13, 2020 entitled "BEAM PATTERN MANAGEMENT FOR CONTROLLING RADIATED POWER LEVELS AND SPATIAL PRIORITY," the entirety of which is incorporated herein by reference.

TECHNICAL FIELD

This disclosure relates to wireless communication and in particular, to beam pattern management for controlling radiated power levels and spatial priority.

BACKGROUND

The Third Generation Partnership Project (3GPP) has developed and is developing standards for Fourth Generation (4G) (also referred to as Long Term Evolution (LTE)) and Fifth Generation (5G) (also referred to as New Radio (NR)) wireless communication systems. Such systems provide, among other features, broadband communication between network nodes, such as base stations, and mobile wireless devices (WD), as well as communication between network nodes and between WDs. In addition, Wi-Fi systems provide radio communications in an unlicensed spectrum via access points. Further, 4G and 5G systems and Wi-Fi systems can be configured to interoperate and communicate. All of these systems, as well as others, may utilize phased array beam forming antennas to transmit and receive radio frequency (RF) signals over the air.

Multiple input multiple output (MIMO) antenna systems include an array of antenna elements, and employ beamforming and spatial multiplexing techniques to control the spatial distribution of the signals radiated by the array to maximize the signal strengths at desired receiver locations.

FIG. 1 is a block diagram of an example wireless communication system 6 that includes wireless devices 8a, 8b and 8c (hereinafter referred to collectively as WDs 8) and a network node 10. A WD 8 includes a receiver 12 having antennas 14. The WDs 8 are in RF communication with the network node 10 which includes a transmitter 16. The transmitter 16 has a beamformer 18 which determines a set of weights to apply to antenna elements 20 of a phased array antenna 22. The weights may be phases that are applied via phase shifters 24. The weights applied to the antenna elements 20 may be calculated to steer one or more beams in the directions of the WDs 8. Note that a WD 8 can be fixed or mobile and may also referred to herein as a user.

The transmitter 16 may use one or more precoders to focus the signals in desired directions. For example, channel state information reference signals (CSI-RS)/precoder feedback and uplink sounding based channel estimation for time division duplex (TDD) systems may be used to determine weights to apply to the signals fed to the elements of the phased array antenna 22 to achieve an desired spatial distribution of RF energy. In some cases, it may be necessary to also manage interference while optimizing the desired signal qualities. Further, there may exist requirements to limit the dissipated power levels at all or specific directions. For example, such a situation happens for spectrum access systems (SAS) or regulatory limits where certain radiation power levels are enforced. In order to limit the undesired interference or avoid creating interference, one basic solution is to perform power back-off, completely shut down the transmission, switch to another frequency in case of a spectral access system or solve a complicated numerical optimization problem. In some cases, a rank-1 precoder is obtained using known lower peak to average power ratio (PAPR) sequences, for example, a rank-1 beamformer based on a Golay sequence.

Avoiding the interference by a complete transmitter shutdown or switching to another band may result in highly inefficient resource utilization. In spectrum access systems, there may be two or more priority levels of accessing the band. For such systems, one would need access privileges to multiple chunks of bands to switch among them to avoid creating interference. Lack of such bands may result in complete cessation of signal transmissions or access to a completely new band or radio access technology (RAT).

In some cases, it would suffice to satisfy an interference threshold rather than switching to another band. For those cases, power back-off may be used for managing the interference and signal strength levels. However, solely backing off the power level utilizes the same beamformer so it may not be efficient in utilizing the available spatial resources to the highest extent. Due to power reduction in all directions, the spatial diversity feature of transmission is highly underutilized. Power back-off may also require more complicated link adaptation methods so that receivers and transmitters can continue benefiting the channel state information feedback without intermittent disruptions in power level. Varying the power levels may also adversely affect the power amplifier efficiencies.

Beamforming solutions based on numerical optimizations require significant computational burden due to the non-deterministic polynomial-time (NP)-hard nature of the problem resulting from many constraints on the radiated power levels in many directions. The optimizations assume a single-rank transmission which reduces complexity. However, application of such optimizations to contemporary massive MIMO networks is quite limited since multi-layer and multi-user MIMO transmissions are essential to attain capacities offered by massive MIMO antenna systems.

Further, existing solutions lack priority awareness, especially in spectrum access systems where there may be WDs trying to access a common spectrum with different priorities, e.g., incumbent, priority access license (PAL), and general authorized (GA) access in spectrum access systems (SAS).

SUMMARY

Some embodiments advantageously provide a method and system for beam pattern management for controlling radiated power levels and spatial priority.

A systematic beamforming method is disclosed that can be used for limiting the maximum transmission power in unwanted directions while maintaining signal qualities in the desired directions. In spectrum access systems, the unwanted directions may be obtained or deduced from the message received from the SAS provider. Some embodiments include methods for adjusting the power levels of the beam pattern lobes to limit dissipated power at preferred directions. In case of regulations on maximum radiated power or intensity, some methods disclosed herein adjust the beam shape by creating interference-aware side-lobes, resulting in reduced beamforming gain in selected directions through a well-defined matrix operation. Thus, some of these methods utilize the spatial dimension of the multi-path medium by diverting the transmitted power towards alternative directions that will create minimal impact to unwanted receivers, while at the same time, the desired receiver will be able to receive transmission from multiple paths creating minimal interference to undesired receivers.

In cases of spectrum sharing, some embodiments avoid the band switch until it is imperative to vacate the band so that the transmitter can utilize the managed spectrum to its full extent. Through a controllable beamforming gain towards unwanted directions, the pattern diversity of the transmission may create an opportunistic transmission to maintain the received signal qualities.

By avoiding the power reduction, some embodiments can create stronger multipath channels by creating controlled sidelobes in preferred or selected directions and hence, can achieve a larger effective angular spread. This larger angular spread results in improved utilization of the spatial access providing enhanced channel diversity.

Some embodiments are in alignment with multi-layer single user (SU)-MIMO or multi-user (MU)-MIMO transmission strategies since these embodiments can create multiple beams in preferred directions with high-rank transmissions. In case of higher rank transmissions, the proposed beam modification can create orthogonal or quasi orthogonal multi-lobe beam patterns per transmission rank, which can enable higher rank transmission subject to directional interference requirements.

For spectrum access systems, some embodiments can be employed for prioritizing WDs in the spatial domain. By creating beam shapes with nulls towards incumbent WDs and using the remaining available degrees of freedom of the massive MIMO system, harmonized spatial sharing in conjunction with spectrum sharing can be achieved. Some embodiments combine concepts of spectrum and spatial sharing Thus, according to one aspect, a method for a network node of selectively transmitting radio frequency beams in a plurality of directions on a plurality of layers to a plurality of wireless devices, the method comprising, for each layer and for each of at least one wireless device. The method includes determining, via the direction information collator, a first set of directions for which power or intensity of radio frequency beams transmitted by the network node is to be limited. The method includes determining, via the direction information collator, a second set of directions that excludes the first set of directions and for which power or intensity of radio frequency beams is permitted to be transmitted at higher levels than levels of power or intensity of radio frequency beams permitted to be transmitted in the first set of directions. The method also includes determining, via the auxiliary direction selector, at least one auxiliary direction of the second set of directions for which a calculated power or intensity exceeds a first threshold. The method further includes modifying, via the precoder adjuster, a precoder based at least in part on a weighted auxiliary matrix having the precoder as one column and having at least one additional column, each of the at least one additional columns corresponding to a radio frequency beam in the at least one auxiliary direction, weighting of the weighted auxiliary matrix being configured to control beam forming gains toward the at least one auxiliary direction. The method further includes transmitting, via the transmitter, radio frequency beams at a power or intensity in a direction determined based at least in part on the modified precoder.

According to this aspect, in some embodiments, the at least one auxiliary direction is selected from a group of directions that are within a predetermined angular range of a radio frequency beam in one of the second set of directions. In some embodiments, each additional column of the weighted auxiliary matrix indicates a maximum power in an auxiliary direction for a layer. In some embodiments, the second set of directions includes at least one direction that is chosen to satisfy a spatial access priority. In some embodiments, the method further includes determining, via the direction information collator, a first set of indices corresponding to directions that are within a second threshold of a direction in the first set of directions, the first set of indices indicating a first group of angles in the first set of directions. In some embodiments, the method further includes determining, via the direction information collator, a second set of indices corresponding to directions that are greater than a third threshold from the direction in the first set of directions and for which radio frequency beam power or intensity exceeds a fourth threshold, the second set of indices indicating a second group of angles in the second set of directions. In some embodiments, a number of the at least one auxiliary direction may be one of increased and decreased to achieve a level of service in a direction of the second set of directions without violating a predetermined constraint. In some embodiments, at least one of the at least one auxiliary direction that is nearest to a particular one of the directions of the second set of directions is determined and used to modify the precoder. In some embodiments, modifying the precoder further includes identifying at least one of the at least one auxiliary direction that has radio frequency beam radiation power or intensity in a specified direction on other layers that is less than a fifth threshold and including the identified at least one auxiliary direction in the weighted auxiliary matrix. In some embodiments, modifying the precoder based at least in part on the weighted auxiliary matrix includes determining a left-singular vector of the weighted auxiliary matrix, the left-singular vector corresponding to a largest singular value of the weighed auxiliary matrix. In some embodiments, modifying the precoder includes performing an auxiliary transformation on the precoder to suppress beam power or intensity to below a sixth threshold in at least one direction.

According to another aspect, a network node is configured to selectively transmit radio frequency beams in a plurality of directions on a plurality of layers to a plurality of wireless devices. The network node includes processing circuitry configured to, for each layer and for each of at least one wireless device: determine a first set of directions for which radio frequency beam power or intensity transmitted by the network node is to be limited, determine a second set of directions that excludes the first set of directions and for which radio frequency beam power or intensity is permitted to be transmitted at higher levels than levels of radio frequency beam power or intensity to be transmitted in the first set of directions, determine at least one auxiliary direction of the second set of directions for which a calculated power or intensity exceeds a first threshold, modify a precoder based at least in part on a weighted auxiliary matrix having the precoder as one column and having at least one additional column, each additional column corresponding to a radio frequency beam in the at least one auxiliary direction, weighting of the weighted auxiliary matrix being configured to control beam forming gains toward the at least one auxiliary direction, and allocate radio frequency beam power or intensity in a direction determined based at least in part on the modified precoder.

According to this aspect, in some embodiments, the at least one auxiliary direction is selected from a group of directions that are within a predetermined angular range of a radio frequency beam in one of the second set of directions. In some embodiments, each additional column of the weighted auxiliary matrix indicates a maximum power or intensity in an auxiliary direction for a layer. In some embodiments, the second set of directions includes at least one direction that is chosen to satisfy a spatial access priority. In some embodiments, the processing circuitry is further configured to determine a first set of indices corresponding to directions that are within a second threshold of a direction in the first set of directions, the first set of indices indicating a first group of angles in the first set of directions. In some embodiments, the processing circuitry is further configured to determine a second set of indices corresponding to directions that are greater than a third threshold from the direction in the first set of directions and for which radio frequency beam power or intensity exceeds a fourth threshold, the second set of indices indicating a second group of angles in the second set of directions. In some embodiments, a number of the at least one auxiliary direction may be one of increased and decreased to achieve a level of service in a direction of the second set of directions without violating a predetermined constraint. In some embodiments, at least one of the at least one auxiliary direction that is nearest to a particular one of the directions of the second set of directions is determined and used to modify the precoder. In some embodiments, modifying the precoder further includes identifying at least one of the at least one auxiliary direction that has radio frequency beam radiation power or intensity in a specified direction on other layers that is less than a fifth threshold and including the identified at least one auxiliary direction in the weighted auxiliary matrix. In some embodiments, modifying the precoder based at least in part on the weighted auxiliary matrix includes determining a left-singular vector of the weighted auxiliary matrix, the left-singular vector corresponding to a largest singular value of the weighed auxiliary matrix. In some embodiments, modifying the precoder includes performing an auxiliary transformation on the precoder to suppress beam power or intensity to below a sixth threshold in at least one direction.

BRIEF DESCRIPTION OF THE DRAWINGS

A more complete understanding of the present embodiments, and the attendant advantages and features thereof, will be more readily understood by reference to the following detailed description when considered in conjunction with the accompanying drawings wherein.

DETAILED DESCRIPTION

Figure 1:
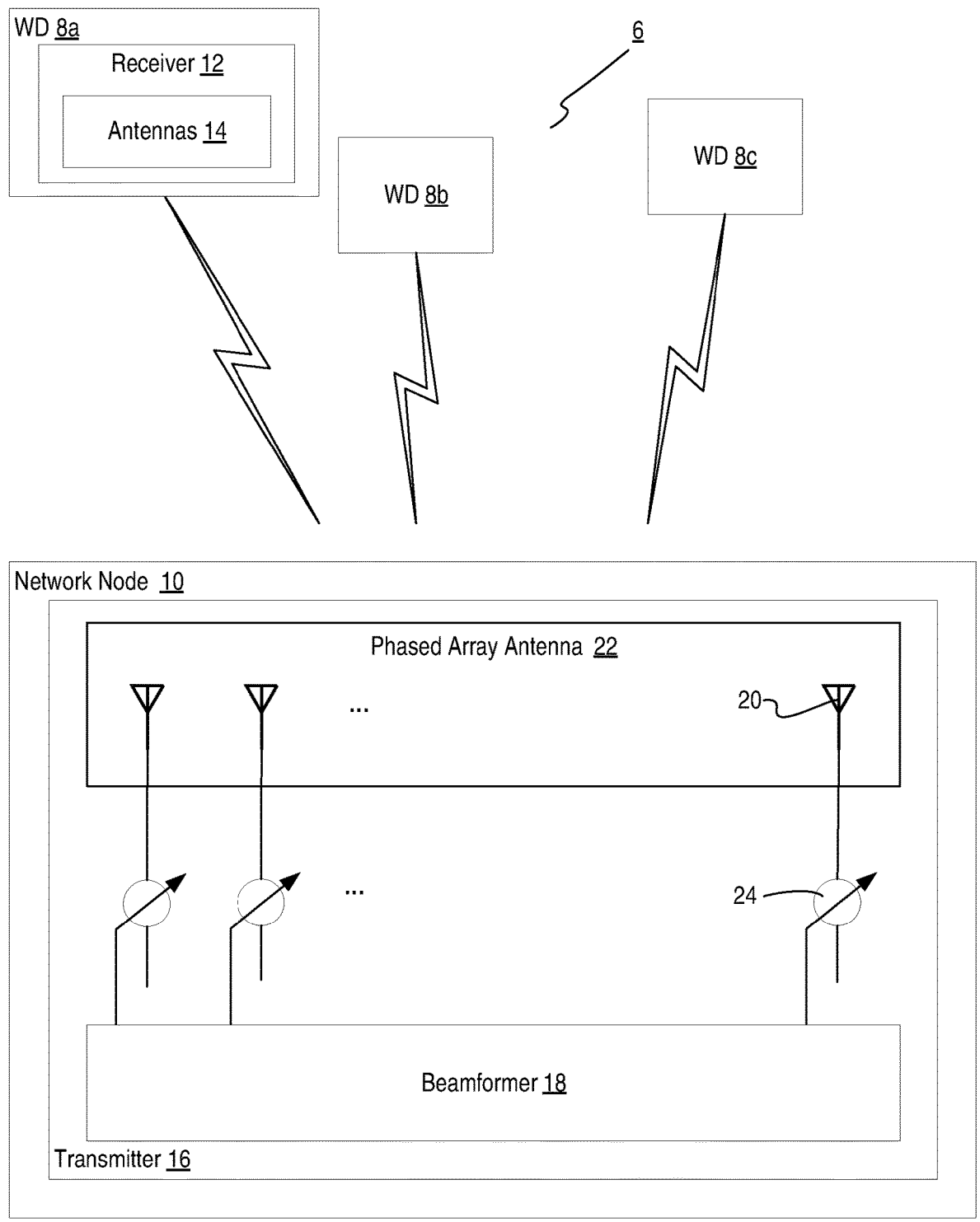
FIG. 1 is a known configuration of a wireless communication system that implements beamforming.

Before describing in detail example embodiments, it is noted that the embodiments reside primarily in combinations of apparatus components and processing steps related to beam pattern management for controlling radiated power levels and spatial priority. Accordingly, components have been represented where appropriate by conventional symbols in the drawings, showing only those specific details that are pertinent to understanding the embodiments so as not to obscure the disclosure with details that will be readily apparent to those of ordinary skill in the art having the benefit of the description herein.

As used herein, relational terms, such as "first" and "second," "top" and "bottom," and the like, may be used solely to distinguish one entity or element from another entity or element without necessarily requiring or implying any physical or logical relationship or order between such entities or elements.

In some embodiments, a method and network node or provided for beam pattern management. According to one aspect, a network node is configured to selectively transmit radio frequency beams in a plurality of directions on a plurality of layers to a plurality of wireless devices. The network node includes processing circuitry configured to direct and beams to a first set of directions while suppressing energy radiated in a second set of directions according to algorithms that modify a precoder to achieve a distribution of radiated energy without computationally burdensome optimization algorithms.

Figure 2:
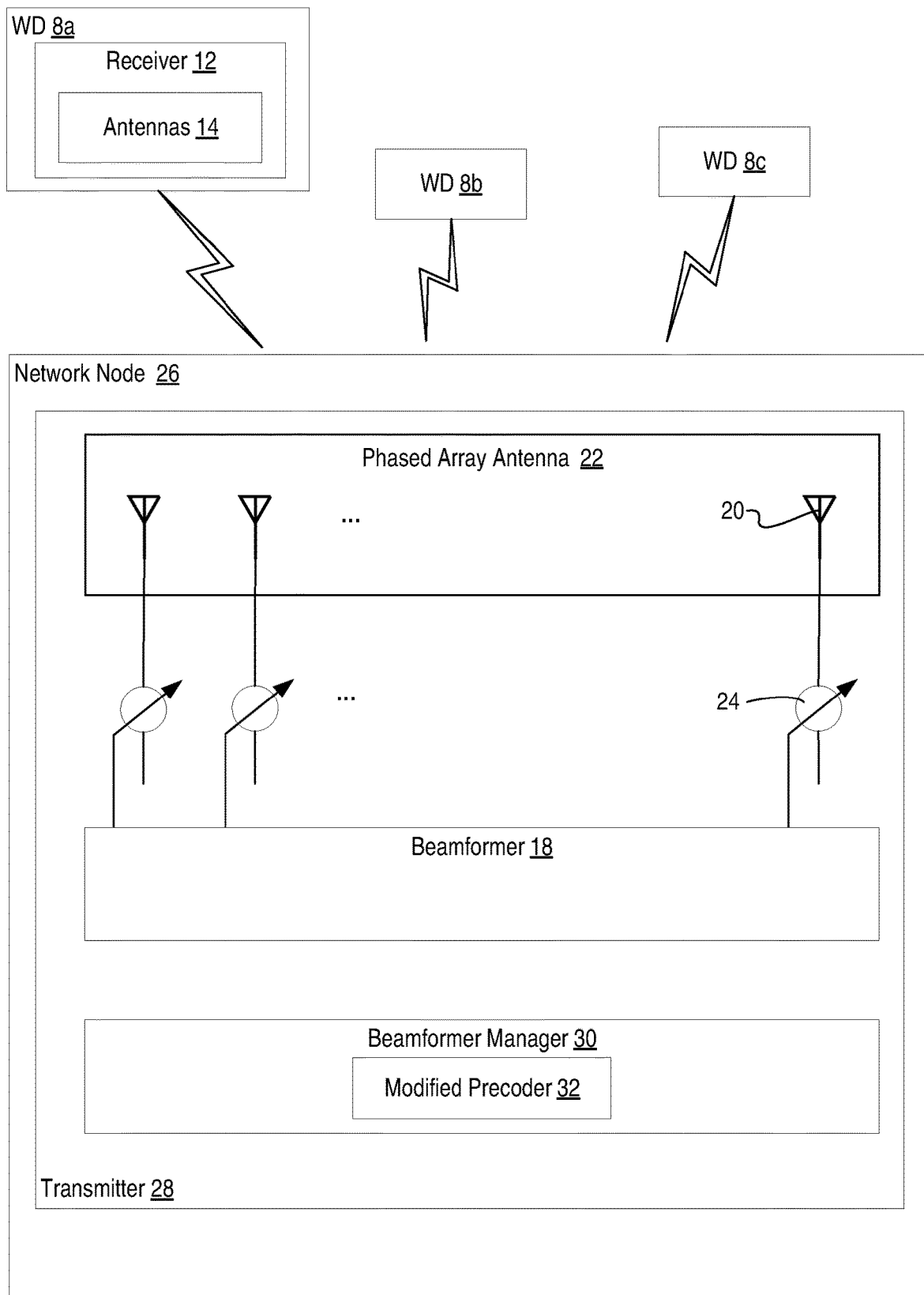
FIG. 2 is a block diagram of a configuration of a network node employing beam management techniques according to principles set forth herein.

Referring again to the drawing figures where like reference designators refer to like elements, FIG. 2 is a block diagram of an example embodiment of a network node 26 having a transmitter 28 with a beamformer manager 30. The beamformer manager 30 determines a modified precoder 32 to form beams according to principles set forth below. Note that although the modified precoder 32 is shown the beamformer manager 30, it could also or alternatively be stored in the beamformer 18.

System Model

In one embodiment, the transmitter 28 is equipped with M antenna elements 20 and a receiver-u 8, u=0, . . . , U−1, is equipped with $N_u$ antennas 14. In a conventional transmitter, the M×$l_u$ precoder $W_u$ is applied to transmit signals directed to receiver-u 8. Here, $l_u$ is the number of layers being sent over the $N_u$×M channel $H_u$. The $l^{th}$ column of $W_u$, denoted by $w_{u,l}$, represents the beamformer for the $l^{th}$ layer, $l_i=0, \ldots, l_{u-1}$, which can be obtained by means of CSI feedback or sounding reference signal (SRS) uplink measurements. Assume a multi-user MIMO orthogonal frequency division multiplexed (OFDM) transmission where the transmitter 28 serves $U_s$ WDs 8 simultaneously over F subcarriers. The total transmit power level at direction $(\theta,\phi)$ can be obtained by $$p_T(\theta, \phi) = F p_0 G_e(\theta, \phi) \frac{1}{l_T} \sum_{j=0}^{U_s-1} \sum_{l=0}^{l_{u_j}-1} |a^H(\theta, \phi) w_{u_j,l}|^2$$

where $a(\theta,\phi)$ is the M×1 steering vector, $G_e(\theta,\phi)$ is the element pattern gain, and $p_0$ is the transmit power level at the resource element. The scaling $l_T = \Sigma_j l_{u_j}$ is for the purpose of normalizing the total power per resource element to $p_0$.

For a single-user MIMO OFDM system, $U_s=1$, i.e., a single WD 8 served on any sub carrier. For this case, assuming U' users are scheduled orthogonal frequency resources such that user—$u_j$ is scheduled over $F_{u_j}$ subcarriers, resulting in:

$$p_{T,su-mimo}(\theta, \phi) = p_0 G_e(\theta, \phi) \frac{1}{l_T} \sum_{j=0}^{U'-1} F_{u_j} \sum_{l=0}^{l_{u_j}-1} |a^H(\theta, \phi) w_{u_j,l}|^2$$

where the total transmission bandwidth is given by $F=\Sigma_{j=0}^{U'-1}F_{u_j}$. The worst-case situation where radiated power can assume a large value in some direction is the case where a whole band is scheduled to a single WD 8 and single-rank transmission is performed, which can potentially result in the largest radiated power levels:

$$p_{T,su\text{-}mimo,MAX}(\theta,\phi)=Fp_0G_e(\theta,\phi)|a^H(\theta,\phi)w_{u_j,l}|^2$$

In any of the above cases, the contribution of each wireless device, e.g., WD 8, to the total radiated power is proportional to the number of scheduled subcarriers for the WDs 8 and the beam forming gain towards the direction of interest.

Consider two regulatory conditions that may be imposed alternatively or together:

(1) Managed spectrum access (e.g., by a spectrum access system): secondary or tertiary WDs 8 are managed to create zero interference or controlled interference to primary (incumbent) or higher-priority tier WDs 8.

The directional information is assumed to be via one or more options below:

a. The transmitter monitors the signals from incumbent or higher-priority WDs 8 and estimates the direction of arrival of the signals or associated beamformers if possible.

b. A spectrum access authority provides the geographical location(s) where the transmitter should avoid creating interference. This information can be converted to a range of angles, $(\theta,\phi) \in R$, towards which the emanated power should be avoided or reduced.

(2) Maximum radiated power limitation: for some or all directions, the maximum power level is limited by regulatory bodies or public authorities. Depending on the deployment and regulation, this information can be converted to a range of angular regions $(\theta,\phi) \in R$ towards which maximum radiated power is limited by a threshold.

In either case, let $(\theta_k,\phi_k)$, $k=0 \ldots, K-1$ denote the K directions towards which the radiated power level is to be limited as follows:

$$p_T(\theta_K,\phi_K) \leq \delta k,$$

which can be expressed as $$\sum_{j=0}^{U_s-1}\sum_{l=0}^{l_{u_j}-1}|a^H(\theta_k,\phi_k)w_{u_j,l}|^2 \leq \frac{\delta_k l_T}{Fp_0G_e(\theta_k,\phi_k)}$$

where $\delta_k$ denotes the maximum radiated power allowed towards direction $(\theta_k,\phi_k)$. At the same time, for user—$u_j$, $j=0, \ldots, K-1$, the radiated power level at desired directions should be maintained, as:

$$\gamma_{i,l} \leq \frac{Fp_0}{l_T}G_e(\theta_i,\phi_i)|a^H(\theta_i,\phi_i)w_{u_j,l}|^2 \leq \beta_{i,l}$$

where $\beta_{i,l}$ is the maximum allowed radiated power of layer-l towards direction $(\theta_i,\phi_i)$, $i=0, \ldots, B-1$, and $\gamma_{i,l}$ denotes a threshold for the minimum radiated power of layer-l towards the desired direction. This can be re-written as:

$$\frac{\gamma_{i,l}l_T}{Fp_0G_e(\theta_i,\phi_i)} \leq |a^H(\theta_i,\phi_i)w_{u_j,l}|^2 \leq \frac{\beta_{i,l}l_T}{Fp_0G_e(\theta_i,\phi_i)} \quad (2)$$

For SU-MIMO systems, letting $U_s=1$, the constraints on the interference and desired signal strengths can be expressed as:

$$\sum_{l=0}^{l_u-1}|a^H(\theta_k,\phi_k)w_{u,l}|^2 \leq \delta'_{u,k}, k=0, \ldots, K-1 \quad (3)$$

$$\gamma'_{u,i} \leq a^H(\theta_i,\phi_i)w_{u,l}|^2 \leq \beta'_{u,l}, i=0, \ldots, B-1 \quad (4)$$

with $$\delta'_{u,k} = \frac{\delta_k l_u}{Fp_0G_e(\theta_k,\phi_k)}, \gamma'_{u,i} = \frac{\gamma_{i,l}l_u}{Fp_0G_e(\theta_i,\phi_i)}, \text{ and } \beta'_{u,l} = \frac{\beta_{i,l}l_u}{Fp_0G_e(\theta_i,\phi_i)}.$$

The methods to be described below rely on (1)-(4) where the regulatory conditions are expressed as a beamformer design subject to a total and per layer power constraints. Note that the expressions derived herein are in terms of power, but can be adapted to be expressed in terms of intensity.

Methods for Single-User MIMO Transmission

Figure 3:
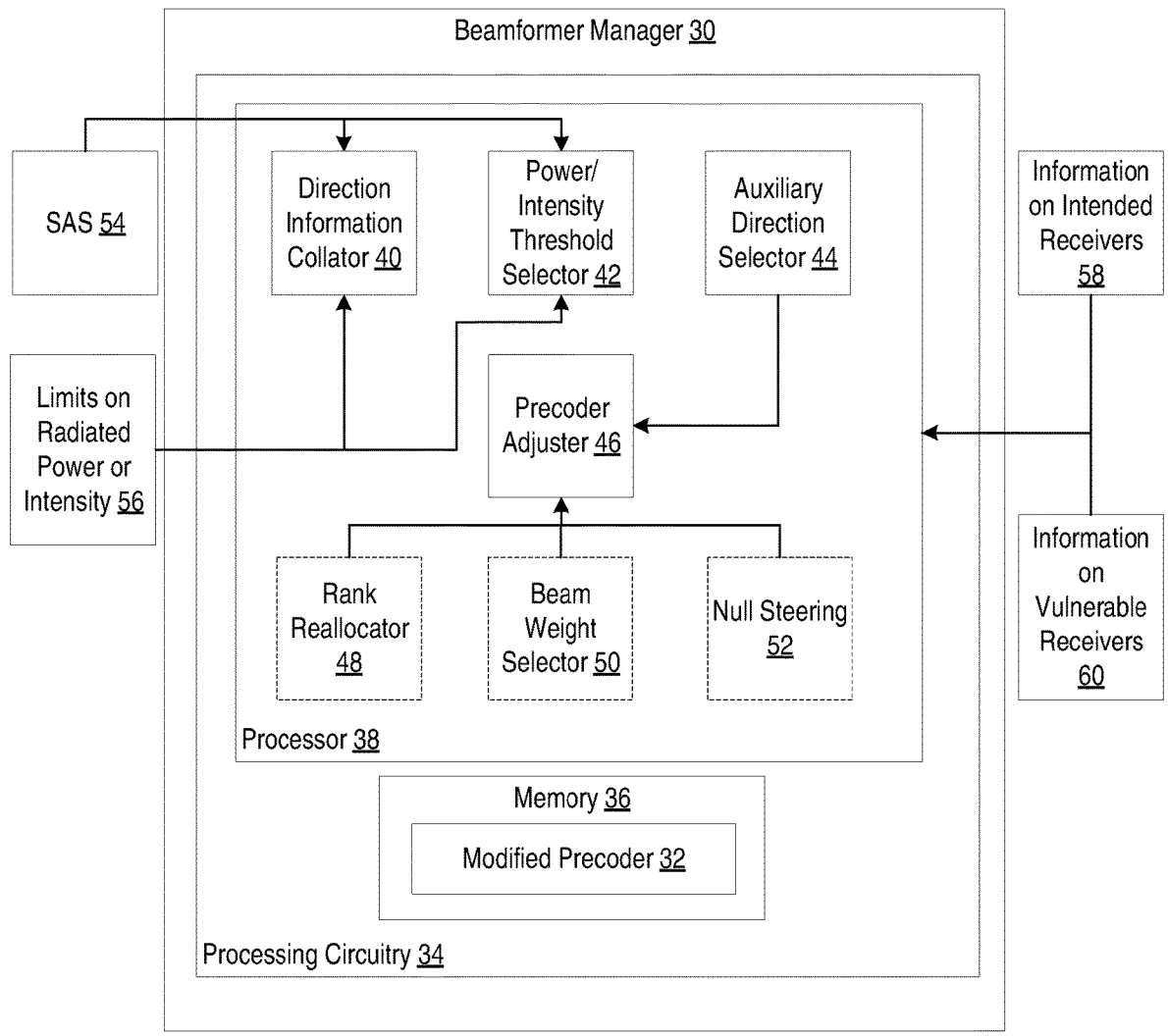
FIG. 3 is a block diagram of a beamformer manager configured according to principles set forth herein.

An example solution for SU-MIMO is presented first, and then the extension to MU-MIMO is presented. Referring to FIG. 3, the beamformer manager 30 includes processing circuitry 34, which may be implemented by the memory 36 and the processor 38. In particular, in addition to or instead of a processor, such as a central processing unit, and memory, the processing circuitry 34 may comprise integrated circuitry for processing and/or control, e.g., one or more processors and/or processor cores and/or FPGAs (Field Programmable Gate Array) and/or ASICs (Application Specific Integrated Circuitry) adapted to execute instructions. The processor 38 may be configured to access (e.g., write to and/or read from) the memory 72, which may comprise any kind of volatile and/or nonvolatile memory, e.g., cache and/or buffer memory and/or RAM (Random Access Memory) and/or ROM (Read-Only Memory) and/or optical memory and/or EPROM (Erasable Programmable Read-Only Memory).

Thus, the beamformer manager 30, which is part of network node 26, further has software stored internally in, for example, memory 36, or stored in external memory (e.g., database, storage array, network storage device, etc.) accessible by the beamformer manager 30 via an external connection. The software may be executable by the processing circuitry 34. The processing circuitry 34 may be configured to control any of the methods and/or processes described herein and/or to cause such methods, and/or processes to be performed, e.g., by the beamformer manager 30 and/or other parts of the network node 26. Processor 38 corresponds to one or more processors 38 for performing beamformer manager 30 functions described herein. The memory 36 is configured to store data, programmatic software code and/or other information described herein. In some embodiments, the software may include instructions that, when executed by the processor 38 and/or processing circuitry 34, causes the processor 38 and/or processing circuitry 34 to perform the processes described herein with respect to beamformer manager 30 and/or other parts of network node 26.

The processor is configured to execute software stored in the memory 36 to implement the functions of a plurality of software and or hardware modules. These modules may include a direction information collator 40, a power threshold selector 42, an auxiliary direction selector 44 and a precoder adjustment module 46. Optionally, the processor may also be configured to execute software including a rank reallocator module 48, a beam weight selector module 50 and a null steering unit module 52. The functions of each of these modules is described below. The direction information collator 40 and the power threshold selector 42 are configured to receive one or both of SAS 54 restrictions and radiated power or intensity limits 56. Also, information on the intended receivers 58 (their directions, for example) and information on vulnerable receivers or (their directions, for example) can be input to the processor 38. Note that although the beamformer manager 30 is shown as a block separate from the beamformer 18, in some embodiments, the beamformer manager 30 is incorporated within the beamformer 18. Note also that the arrows between the components in FIG. 3 represent only some of the exchanges of information between software or hardware modules. Other information exchanges between the various modules may take place that are not shown by arrows in FIG. 3.

Let $F_{M \times G}$ denote a spatial Discrete Fourier Transform matrix (S-DFT) where G is the number of sampled beam directions that contain the angular region of which radiated power levels are required to be controlled. The S-DFT can be designed to include the most vulnerable directions (to be defined below) in addition to the usual grid-of-beam associated columns.

Column-g, $f_g$, of F, g=0, ..., G−1, corresponds to a phased array beamformer creating a beam towards the direction $(\Theta_g, \Phi_g)$ in the angular domain. The S-DFT of the precoder can be obtained using:

$$V_u = F^H W_u.$$

The strengths of radiated power towards direction g, g=0, ..., G−1, for layer-l is given by $$p_{u,a,l} = |V_u[g,l]|^2.$$

For each layer, $p_{u,g,l}$ can be sorted in descending order such that $p_{u,a_0,l} \geq p_{u,a_1,l} \geq \ldots \geq p_{u,a_{G-1},l}$.

For each vulnerable direction k, the S-DFT column indices may be determined by a threshold test:

$$S_k = \arg_{n|k} \{|\theta_n - \theta_k| + |\Phi_n - \phi_k| \leq D_{th1}\}$$

where $S_k$ may contain a set of indices-n. This threshold test may be implemented by the direction information collator 40 based on input from SAS 54 and radiation or intensity limits 56.

For each layer-l, the direction information collator 40 may also determine directions that are away from the vulnerable directions (excluding the strong directions of the other layers):

$$T_{k,l} = \arg_{n|k} \{|\Theta_n - \theta_k| + |\Phi_n - \phi_k| \geq D_{th2}\} / \bigcup_{j \neq l} Q_j$$

where $Q_j = \{g: p_{u,g,j} \geq D_{th3}\}$. $D_{th1}$, $D_{th2}$ and $D_{th3}$ are design parameters that can be selected by a network planner based on the network requirements, access priority of WDs 8 in case of spectrum access systems, and/or the power levels indicated in inequalities (1)-(4). Thus, $T_{k,l}$ contains the directions towards which the transmitter 28 can send signals without violating the regulatory conditions while minimally impacting the inter-layer interference, and satisfying some form of spatial access priority in relation to spectrum access priority. Note that the thresholds disclosed herein may be selected by the power threshold selector 42 based on input from SAS 54 and radiation or intensity limits 56.

The elements of $T_{k,l}$ can be grouped such that each group contains beams that are close to each other. Then, the set $T_{k,l}$ is determined by keeping the indices that are closest to phase-center or angular center of each group and removing all other indices.

For or each $$\text{layer-}l, g_l^* = \max_{g|l} p_{u,g,l},$$

which indicates the strongest radiation direction for that layer, is obtained and an $M \times l_u$ auxiliary matrix is defined as follows:

$$\Upsilon_u = [f_{g^*_0} \ldots f_{g^*_{i_u-1}}].$$

For layer-l, if $p_{u,g,l} \geq D_{th4}$ for any $g \in S_k$, depending on the allowed interference level towards $(\theta_k, \phi_k)$, one or more directions from $T_{k,l}$ are selected and the precoder $w_{u,l}$ is modified using:

$$w'_{u,l} = Z_{\mathcal{L}_l} \psi([w_{u,l} f_{g_0} \ldots f_{g_{X-1}}] \Gamma) \quad (1)$$

as implemented by the precoder adjustment module 46, where:

- $w'_{u,l}$ is the modified precoder;
- $g_x \in T_{k,l}$ denote the auxiliary directions, which may be determined by the auxiliary direction selector 44;
- $\psi(A)$ is a function returning the left-singular vector of matrix A corresponding to largest singular value;
- $\Gamma = \text{diag}([\gamma_0, \ldots, \gamma_{1+X}])$ is a diagonal weighting matrix for controlling the beamforming gain towards selected directions, as implemented by the beam weight selector module 50; and
- $Z_{\mathcal{L}_l}$ is an optional mapper that can be used for minimizing the impact on selected layers $$Z_{\mathcal{L}_l} = I - \Upsilon_{u,\mathcal{L}_l} (\Upsilon_{u,\mathcal{L}_l}^H \Upsilon_{u,\mathcal{L}_l})^{-1} \Upsilon_{u,\mathcal{L}_l}^H$$

with $$\mathcal{L}_{\mathcal{L}_l} \triangleq \{l\} \cup \{i: p_{u,g^*_i,i} \leq D_{th6}, i+1, i=0, \ldots, l_u-1\},$$

and $\Upsilon_{u,\mathcal{L}_l}$ obtained by removing the columns-$l \in \mathcal{L}_l$ of $\Upsilon_u$. The set $\mathcal{L}_l$ indicates the direction of the main layer-l, as well as the directions towards which a resulting beam will not create a radiation power or intensity towards the other layers, e.g., radiated power or intensity being less than a threshold value $D_{th6}$.

The value of $|a^H(\theta_k,\phi_k) w_{u,l}|^2$ can be maintained by adjusting the beam-weights $\Gamma$, and increasing or decreasing the number and values of auxiliary directions $f_g$ used in Equation (5) and varying their angular position according to target radiated power or intensity thresholds. Use of the proper left-singular vector of the weighted auxiliary precoder provides a beam with controllable gains over selected auxiliary directions while maintaining the beam shape of the original beamformer, thereby avoiding heavy numerical optimizations to perform the array synthesis to achieve a similar pattern.

In cases where a spectrum access system creates extreme restrictions, the rank of transmission can be reduced by omitting the transmissions towards the most vulnerable direction(s).

Methods for Multi-User MIMO Transmission

The arrangements provided herein for SU-MIMO can be adopted to MU-MIMO cases. For MU-MIMO, $T_{k,l}$ may be modified such that all directions corresponding to the other layers are also excluded:

$$T_{u_m,k,l} = T_{k,l} / \bigcup_{d=0, d \neq m}^{U_s - 1} \bigcup_{j=0}^{l_{u_d} - 1} \{g : p_{u_d, g, j} \geq D_{th5, d, j}\}.$$

The thresholds $D_{th5,d,j}$ can be selected, via the power/intensity threshold selector 42, based on the interference regulations towards $(\theta_k, \phi_k)$ and the required minimal strengths for the directions $g^*_l$ for each WD 8 obtained from the inequalities (1)-(4). The auxiliary directions used in Equation (5) may be selected from the set $T_{u_m,k,l}$, e.g., $g_x \in T_{u_m,k,l}$.

In the MU-MIMO case, as many as $M - l_{u_m}$ directions to suppress the interference can be selected and the projection matrix $Z_{\mathcal{L}_l}$ can be determined, accordingly. Prior to constructing $Z_{\mathcal{L}_l}$, a rank of each WD 8 can be reduced to manage interference towards the most vulnerable directions. Furthermore, in constructing $Z_{\mathcal{L}_l}$, one can also do rank allocation in conjunction with auxiliary direction selection, e.g., selection of X and the S-DFT columns $g_x$ used in Equation (5).

Thus, information is collected from multiple resources; an assessment is performed by the beamformer manager 30 to determine the vulnerable directions and auxiliary directions towards which transmitted beams will not create interference for vulnerable receivers, in some embodiments. Optional rank allocation 48 and beam weight selection modules 50 can be employed to tune the desired signal or interference level towards selected directions, and satisfy access priority requirements. The precoder adjustment module 46 may be employed to determine the weights to create the managed beam shape, which can further be modified by the optional null steering module 52 to ensure minimal inter-layer interference for the desired directions.

These methods can be implemented in the cloud. In fact, spectrum access systems are already cloud-based systems. The cloud radio access network (RAN) can also have access to regulation information relevant to deployment and inter-cluster interference to inform individual network nodes to adjust the interference management matrices $Z_l$ and $\psi[w_{u,l} f_{g_0} \ldots f_{g_{X-1}}])$ in Equation (5).

Asystematic interference aware SU and MU-MIMO transmission schemes have been described. In some embodiments, a precoder obtained by conventional means can be updated using a well-defined matrix operation that minimizes the impact on desired transmissions and abides by regulatory requirements. In the case of MU-MIMO, depending on the allowed radiated power or intensity levels towards the regulated directions, the degrees of freedom can be efficiently utilized to selectively choose directions of transmission and adjust the radiated signal power level towards the selected directions while maintaining network performance.

Figure 4:
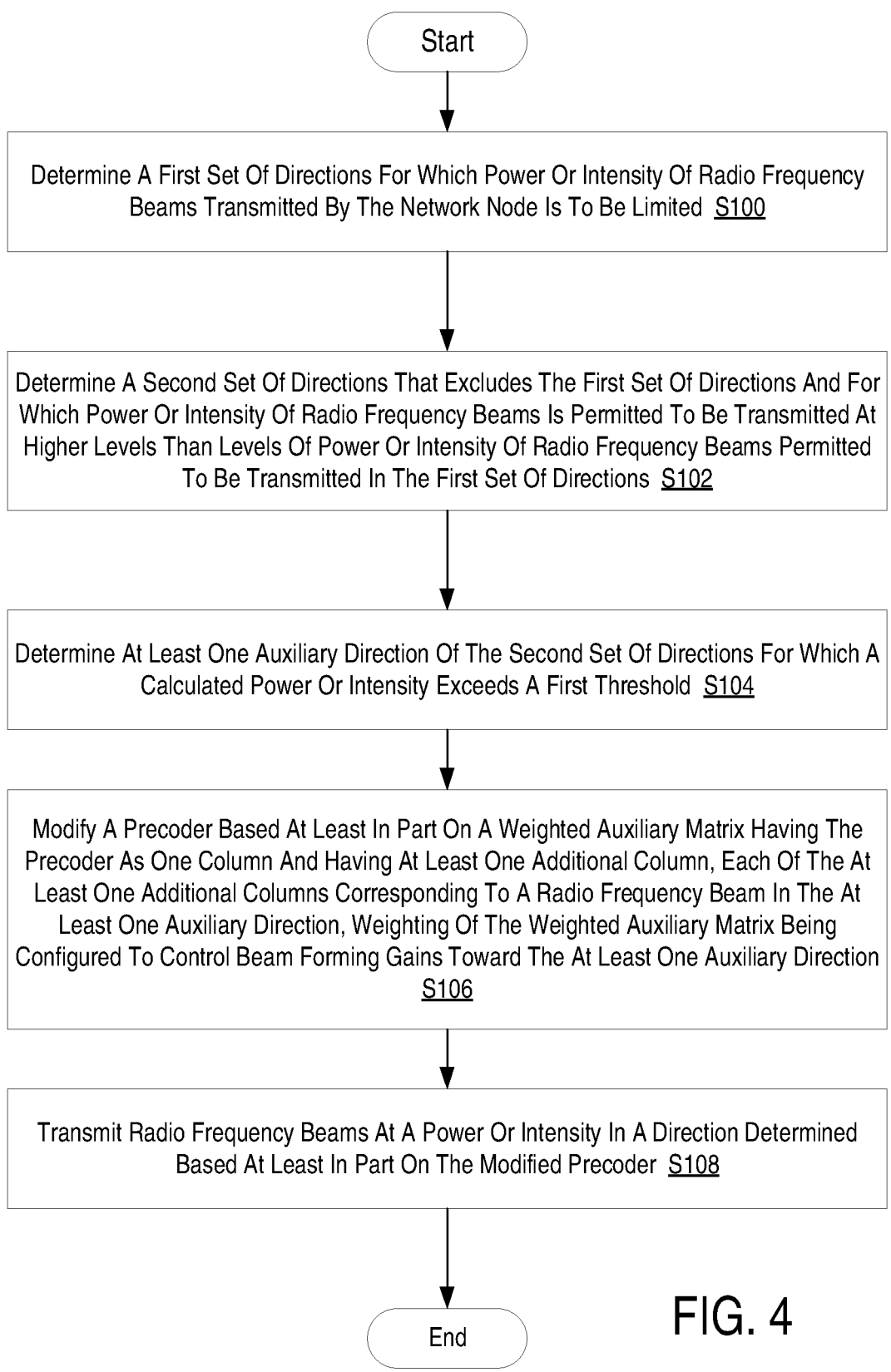
FIG. 4 is a flowchart of an example process for implementing beam management as set forth herein.

FIG. 4 is a flowchart of an example process for selectively transmitting, via the transmitter 28, radio frequency beams in a plurality of directions on a plurality of layers to a plurality of wireless devices 8, according to principles set forth above. The process may be performed by processing circuitry 34, including the memory 36 and the processor 38. The process includes determining a first set of directions for which power or intensity of radio frequency beams transmitted by the network node is to be limited (Block S100). The process also includes determining a second set of directions that excludes the first set of directions and for which power or intensity of radio frequency beams is permitted to be transmitted at higher levels than levels of power or intensity of radio frequency beams permitted to be transmitted in the first set of directions (Block S102). The process further includes determining at least one auxiliary direction of the second set of directions for which a calculated power or intensity exceeds a first threshold (Block S104). A precoder is modified based at least in part on a weighted auxiliary matrix having the precoder as one column and having at least one additional column, each of the at least one additional columns corresponding to a radio frequency beam in the at least one auxiliary direction, weighting of the weighted auxiliary matrix being configured to control beam forming gains toward the at least one auxiliary direction (Block S106). The process further includes transmitting radio frequency beams at a power or intensity in a direction determined based at least in part on the modified precoder (Block S108).

Thus, according to one aspect, a method for a network node 26 of selectively transmitting radio frequency beams in a plurality of directions on a plurality of layers to a plurality of wireless devices, the method comprising, for each layer and for each of at least one wireless device. The method includes determining, via the direction information collator 40, a first set of directions for which power or intensity of radio frequency beams transmitted by the network node is to be limited. The method includes determining, via the direction information collator 40, a second set of directions that excludes the first set of directions and for which power or intensity of radio frequency beams is permitted to be transmitted at higher levels than levels of power or intensity of radio frequency beams permitted to be transmitted in the first set of directions. The method also includes determining, via the auxiliary direction selector 44, at least one auxiliary direction of the second set of directions for which a calculated power or intensity exceeds a first threshold. The method further includes modifying, via the precoder adjustment module 46, a precoder based at least in part on a weighted auxiliary matrix having the precoder as one column and having at least one additional column, each of the at least one additional columns corresponding to a radio frequency beam in the at least one auxiliary direction, weighting of the weighted auxiliary matrix being configured to control beam forming gains toward the at least one auxiliary direction. The method further includes transmitting, via the transmitter 28, radio frequency beams at a power or intensity in a direction determined based at least in part on the modified precoder 32.

According to this aspect, in some embodiments, the at least one auxiliary direction is selected from a group of directions that are within a predetermined angular range of a radio frequency beam in one of the second set of directions. In some embodiments, each additional column of the weighted auxiliary matrix indicates a maximum power in an auxiliary direction for a layer. In some embodiments, the second set of directions includes at least one direction that is chosen to satisfy a spatial access priority. In some embodiments, the method further includes determining, via the direction information collator 40, a first set of indices corresponding to directions that are within a second threshold of a direction in the first set of directions, the first set of indices indicating a first group of angles in the first set of directions. In some embodiments, the method further includes determining, via the direction information collator 40, a second set of indices corresponding to directions that are greater than a third threshold from the direction in the first set of directions and for which radio frequency beam power or intensity exceeds a fourth threshold, the second set of indices indicating a second group of angles in the second set of directions. In some embodiments, a number of the at least one auxiliary direction may be one of increased and decreased to achieve a level of service in a direction of the second set of directions without violating a predetermined constraint. In some embodiments, at least one of the at least one auxiliary direction that is nearest to a particular one of the directions of the second set of directions is determined and used to modify the precoder. In some embodiments, modifying the precoder further includes identifying at least one of the at least one auxiliary direction that has radio frequency beam radiation power or intensity in a specified direction on other layers that is less than a fifth threshold and including the identified at least one auxiliary direction in the weighted auxiliary matrix. In some embodiments, modifying the precoder based at least in part on the weighted auxiliary matrix includes determining a left-singular vector of the weighted auxiliary matrix, the left-singular vector corresponding to a largest singular value of the weighed auxiliary matrix. In some embodiments, modifying the precoder includes performing an auxiliary transformation on the precoder to suppress beam power or intensity to below a sixth threshold in at least one direction.

According to another aspect, a network node 26 is configured to selectively transmit radio frequency beams in a plurality of directions on a plurality of layers to a plurality of wireless devices. The network node 26 includes processing circuitry 34 configured to, for each layer and for each of at least one wireless device: determine a first set of directions for which radio frequency beam power or intensity transmitted by the network node is to be limited, determine a second set of directions that excludes the first set of directions and for which radio frequency beam power or intensity is permitted to be transmitted at higher levels than levels of radio frequency beam power or intensity to be transmitted in the first set of directions, determine at least one auxiliary direction of the second set of directions for which a calculated power or intensity exceeds a first threshold, modify a precoder based at least in part on a weighted auxiliary matrix having the precoder as one column and having at least one additional column, each additional column corresponding to a radio frequency beam in the at least one auxiliary direction, weighting of the weighted auxiliary matrix being configured to control beam forming gains toward the at least one auxiliary direction, and allocate radio frequency beam power or intensity in a direction determined based at least in part on the modified precoder.

According to this aspect, in some embodiments, the at least one auxiliary direction is selected from a group of directions that are within a predetermined angular range of a radio frequency beam in one of the second set of directions. In some embodiments, each additional column of the weighted auxiliary matrix indicates a maximum power or intensity in an auxiliary direction for a layer. In some embodiments, the second set of directions includes at least one direction that is chosen to satisfy a spatial access priority. In some embodiments, the processing circuitry 34 is further configured to determine a first set of indices corresponding to directions that are within a second threshold of a direction in the first set of directions, the first set of indices indicating a first group of angles in the first set of directions. In some embodiments, the processing circuitry 34 is further configured to determine a second set of indices corresponding to directions that are greater than a third threshold from the direction in the first set of directions and for which radio frequency beam power or intensity exceeds a fourth threshold, the second set of indices indicating a second group of angles in the second set of directions. In some embodiments, a number of the at least one auxiliary direction may be one of increased and decreased to achieve a level of service in a direction of the second set of directions without violating a predetermined constraint. In some embodiments, at least one of the at least one auxiliary direction that is nearest to a particular one of the directions of the second set of directions is determined and used to modify the precoder. In some embodiments, modifying the precoder further includes identifying at least one of the at least one auxiliary direction that has radio frequency beam radiation power or intensity in a specified direction on other layers that is less than a fifth threshold and including the identified at least one auxiliary direction in the weighted auxiliary matrix. In some embodiments, modifying the precoder based at least in part on the weighted auxiliary matrix includes determining a left-singular vector of the weighted auxiliary matrix, the left-singular vector corresponding to a largest singular value of the weighed auxiliary matrix. In some embodiments, modifying the precoder includes performing an auxiliary transformation on the precoder to suppress beam power or intensity to below a sixth threshold in at least one direction.

As will be appreciated by one of skill in the art, the concepts described herein may be embodied as a method, data processing system, and/or computer program product. Accordingly, the concepts described herein may take the form of an entirely hardware embodiment, an entirely software embodiment or an embodiment combining software and hardware aspects all generally referred to herein as a "circuit" or "module." Furthermore, the disclosure may take the form of a computer program product on a tangible computer usable storage medium having computer program code embodied in the medium that can be executed by a computer. Any suitable tangible computer readable medium may be utilized including hard disks, CD-ROMs, electronic storage devices, optical storage devices, or magnetic storage devices.

Some embodiments are described herein with reference to flowchart illustrations and/or block diagrams of methods, systems and computer program products. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable memory or storage medium that can direct a computer or other programmable data processing apparatus to function in a particular manner, such that the instructions stored in the computer readable memory produce an article of manufacture including instruction means which implement the function/act specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide steps for implementing the functions/acts specified in the flowchart and/or block diagram block or blocks. It is to be understood that the functions/acts noted in the blocks may occur out of the order noted in the operational illustrations. For example, two blocks shown in succession may in fact be executed substantially concurrently or the blocks may sometimes be executed in the reverse order, depending upon the functionality/acts involved. Although some of the diagrams include arrows on communication paths to show a primary direction of communication, it is to be understood that communication may occur in the opposite direction to the depicted arrows.

Computer program code for carrying out operations of the concepts described herein may be written in an object oriented programming language such as Java® or C++. However, the computer program code for carrying out operations of the disclosure may also be written in conventional procedural programming languages, such as the "C" programming language. The program code may execute entirely on the user's computer, partly on the user's computer, as a stand-alone software package, partly on the user's computer and partly on a remote computer or entirely on the remote computer. In the latter scenario, the remote computer may be connected to the user's computer through a local area network (LAN) or a wide area network (WAN), or the connection may be made to an external computer (for example, through the Internet using an Internet Service Provider).

Many different embodiments have been disclosed herein, in connection with the above description and the drawings. It will be understood that it would be unduly repetitious and obfuscating to literally describe and illustrate every combination and subcombination of these embodiments. Accordingly, all embodiments can be combined in any way and/or combination, and the present specification, including the drawings, shall be construed to constitute a complete written description of all combinations and subcombinations of the embodiments described herein, and of the manner and process of making and using them, and shall support claims to any such combination or subcombination. Some abbreviations include:

| Abbreviation | Explanation |
| --- | --- |
| MIMO | Multiple-input multiple-output |
| MU-MIMO | Multi-user MIMO |
| OFDM | Orthogonal Frequency Division Multiplexing |
| S-DFT | Spatial Discrete Fourier Transform |

It will be appreciated by persons skilled in the art that the embodiments described herein are not limited to what has been particularly shown and described herein above. In addition, unless mention was made above to the contrary, it should be noted that all of the accompanying drawings are not to scale. A variety of modifications and variations are possible in light of the above teachings without departing from the scope of the following claims.

What is claimed is:

1. A method for a network node of selectively transmitting radio frequency beams in a plurality of directions on a plurality of layers to a plurality of wireless devices, the method comprising, for each layer and for each of at least one wireless device:
    determining a first set of directions for which power or intensity of radio frequency beams transmitted by the network node is to be limited;
    determining a second set of directions that excludes the first set of directions and for which power or intensity of radio frequency beams is permitted to be transmitted at higher levels than levels of power or intensity of radio frequency beams permitted to be transmitted in the first set of directions;
    determining at least one auxiliary direction of the second set of directions for which a calculated power or intensity exceeds a first threshold;
    modifying a precoder based at least in part on a weighted auxiliary matrix having the precoder as one column and having at least one additional column, each of the at least one additional columns corresponding to a radio frequency beam in the at least one auxiliary direction, weighting of the weighted auxiliary matrix being configured to control beam forming gains toward the at least one auxiliary direction; and
    transmitting radio frequency beams at a power or intensity in a direction determined based at least in part on the modified precoder.

2. The method of claim 1, wherein the at least one auxiliary direction is selected from a group of directions that are within a predetermined angular range of a radio frequency beam in one of the second set of directions.

3. The method of claim 1, wherein each additional column of the weighted auxiliary matrix indicates a maximum power in an auxiliary direction for a layer.

4. The method of claim 1, wherein the second set of directions includes at least one direction that is chosen to satisfy a spatial access priority.

5. The method of claim 1, further comprising determining a first set of indices corresponding to directions that are within a second threshold of a direction in the first set of directions, the first set of indices indicating a first group of angles in the first set of directions.

6. The method of claim 5, further comprising determining a second set of indices corresponding to directions that are greater than a third threshold from the direction in the first set of directions and for which radio frequency beam power or intensity exceeds a fourth threshold, the second set of indices indicating a second group of angles in the second set of directions.

7. The method of claim 1, wherein a number of the at least one auxiliary direction may be one of increased and decreased to achieve a level of service in a direction of the second set of directions without violating a predetermined constraint.

8. The method of claim 1, wherein at least one of the at least one auxiliary direction that is nearest to a particular one of the directions of the second set of directions is determined and used to modify the precoder.

9. The method of claim 1, wherein modifying the precoder further includes identifying at least one of the at least one auxiliary direction that has radio frequency beam radiation power or intensity in a specified direction on other layers that is less than a fifth threshold and including the identified at least one auxiliary direction in the weighted auxiliary matrix.

10. The method of claim 1, wherein modifying the precoder based at least in part on the weighted auxiliary matrix includes determining a left-singular vector of the weighted auxiliary matrix, the left-singular vector corresponding to a largest singular value of the weighed auxiliary matrix.

11. The method of claim 1, wherein modifying the precoder includes performing an auxiliary transformation on the precoder to suppress beam power or intensity to below a sixth threshold in at least one direction.

12. A network node configured to selectively transmit radio frequency beams in a plurality of directions on a plurality of layers to a plurality of wireless devices, the network node comprising processing circuitry configured to, for each layer and for each of at least one wireless device:
  determine a first set of directions for which radio frequency beam power or intensity transmitted by the network node is to be limited;
  determine a second set of directions that excludes the first set of directions and for which radio frequency beam power or intensity is permitted to be transmitted at higher levels than levels of radio frequency beam power or intensity to be transmitted in the first set of directions;
  determine at least one auxiliary direction of the second set of directions for which a calculated power or intensity exceeds a first threshold;
  modify a precoder based at least in part on a weighted auxiliary matrix having the precoder as one column and having at least one additional column, each additional column corresponding to a radio frequency beam in the at least one auxiliary direction, weighting of the weighted auxiliary matrix being configured to control beam forming gains toward the at least one auxiliary direction; and
  allocate radio frequency beam power or intensity in a direction determined based at least in part on the modified precoder.

13. The network node of claim 12, wherein the at least one auxiliary direction is selected from a group of directions that are within a predetermined angular range of a radio frequency beam in one of the second set of directions.

14. The network node of claim 12, wherein each additional column of the weighted auxiliary matrix indicates a maximum power or intensity in an auxiliary direction for a layer.

15. The network node of claim 12, wherein the second set of directions includes at least one direction that is chosen to satisfy a spatial access priority.

16. The network node of claim 12, wherein the processing circuitry is further configured to determine a first set of indices corresponding to directions that are within a second threshold of a direction in the first set of directions, the first set of indices indicating a first group of angles in the first set of directions.

17. The network node of claim 16, wherein the processing circuitry is further configured to determine a second set of indices corresponding to directions that are greater than a third threshold from the direction in the first set of directions and for which radio frequency beam power or intensity exceeds a fourth threshold, the second set of indices indicating a second group of angles in the second set of directions.

18. The network node of claim 12, wherein a number of the at least one auxiliary direction may be one of increased and decreased to achieve a level of service in a direction of the second set of directions without violating a predetermined constraint.

19. The network node of claim 12, wherein at least one of the at least one auxiliary direction that is nearest to a particular one of the directions of the second set of directions is determined and used to modify the precoder.

20. The network node of claim 12, wherein modifying the precoder further includes identifying at least one of the at least one auxiliary direction that has radio frequency beam radiation power or intensity in a specified direction on other layers that is less than a fifth threshold and including the identified at least one auxiliary direction in the weighted auxiliary matrix.

21. The network node of claim 12, wherein modifying the precoder based at least in part on the weighted auxiliary matrix includes determining a left-singular vector of the weighted auxiliary matrix, the left-singular vector corresponding to a largest singular value of the weighed auxiliary matrix.

22. The network node of claim 12, wherein modifying the precoder includes performing an auxiliary transformation on the precoder to suppress beam power or intensity to below a sixth threshold in at least one direction.

* * * * *